(12) United States Patent
Beelitz

(10) Patent No.: US 6,279,093 B1
(45) Date of Patent: Aug. 21, 2001

(54) COMPUTER SYSTEM AND METHOD FOR PREPARING A COMPUTER-READABLE MEDIUM

(75) Inventor: Alan E. Beelitz, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/198,731

(22) Filed: Nov. 24, 1998

(51) Int. Cl.$^7$ .................................................. G06F 12/02
(52) U.S. Cl. ............................................ 711/173; 711/202
(58) Field of Search .................................. 711/153, 173, 711/202, 170, 171, 172

(56) References Cited

U.S. PATENT DOCUMENTS

| | | | |
|---|---|---|---|
| 4,511,964 | * 4/1985 | Georg et al. | 711/202 |
| 5,247,634 | * 9/1993 | Cline et al. | 707/205 |
| 5,271,018 | 12/1993 | Chan | 714/710 |
| 5,325,519 | 6/1994 | Long et al. | 714/15 |
| 5,455,926 | 10/1995 | Keele et al. | 326/81 |
| 5,537,540 | 7/1996 | Miller et al. | 714/38 |
| 5,537,588 | 7/1996 | Engelmann et al. | 707/202 |
| 5,539,879 | 7/1996 | Pearce et al. | 714/47 |
| 5,586,327 | 12/1996 | Bealkowski et al. | 713/2 |
| 5,588,138 | * 12/1996 | Bai et al. | 711/173 |
| 5,600,840 | 2/1997 | Pearce et al. | 713/323 |
| 5,604,906 | 2/1997 | Murphy et al. | 717/11 |
| 5,668,992 | 9/1997 | Hammer et al. | 713/1 |
| 5,706,472 | 1/1998 | Ruff et al. | 711/173 |
| 5,713,002 | * 1/1998 | Zbikowski et al. | 711/112 |
| 5,748,980 | 5/1998 | Lipe et al. | 710/8 |
| 5,829,053 | 10/1998 | Smith et al. | 711/202 |
| 5,974,517 | * 10/1999 | Gaudet | 711/173 |
| 6,032,239 | * 2/2000 | Beelitz | 711/173 |
| 6,092,150 | * 7/2000 | Sokolov et al. | 711/113 |
| 6,101,192 | * 8/2000 | Wakeland | 370/429 |

FOREIGN PATENT DOCUMENTS

| | | |
|---|---|---|
| 0 760 500 | 3/1997 | (EP) . |
| 0 820 003 | 1/1998 | (EP) . |

\* cited by examiner

Primary Examiner—Hiep T. Nguyen
(74) Attorney, Agent, or Firm—Haynes and Boone, L.L.P.

(57) ABSTRACT

A computer system includes a computer-readable medium. First and second partitions are formed within the computer-readable medium. The second partition is within the first partition. A computer program is processable by the computer system for causing the computer system to form the first and second partitions. The computer program is accessible by apparatus in the computer system.

25 Claims, 4 Drawing Sheets

COMPUTER SYSTEM AND METHOD FOR PREPARING A COMPUTER-READABLE MEDIUM

This application relates to co-pending U.S. patent application Ser. No. 08/950,545, filed Oct. 15, 1997, now U.S. Pat. No. 6,032,239, entitled SYSTEM AND METHOD FOR UPDATING PARTITION MAPPINGS TO LOGICAL DRIVES IN A COMPUTER MEMORY DEVICE, naming Alan E. Beelitz as inventor. The co-pending application is incorporated herein by reference in its entirety, and is assigned to the assignee of this application.

This application relates to U.S. patent application Ser. No. 09/012,196, filed Jan. 23, 1998, now abandoned, entitled SYSTEM AND METHOD FOR PREPARING A COMPUTER MEMORY, naming Alan E. Beelitz as inventor. The co-pending application is incorporated herein by reference in its entirety, and is assigned to the assignee of this application.

This application relates to co-pending U.S. patent application Ser. No. 09/198,701, filed concurrently herewith, entitled COMPUTER SYSTEM AND METHOD FOR ACCESSING A COMPUTER-READABLE MEDIUM, naming Alan E. Beelitz as inventor. The co-pending application is incorporated herein by reference in its entirety, and is assigned to the assignee of this application.

BACKGROUND

The disclosures herein relate in general to information processing systems and in particular to a computer system and method for preparing a computer-readable medium.

A computer may include a computer-readable medium, such as a hard disk. Computer programs have been created for preparing the computer-readable medium (e.g. formatting it and suitably adding, modifying or deleting one or more partitions on it). Nevertheless, previous techniques of such programs are inefficient.

A partition is a unit of logical organization within a computer-readable medium. In one example, the computer forms multiple partitions on a hard disk. According to a previous technique, if one of the partitions is deleted, then at least one other partition is extensively modified or recreated in order to reallocate sectors from the deleted partition to the other partition. Such extensive modification or recreation is inefficient.

Accordingly, a need has arisen for a computer system and method for preparing a computer-readable medium, in which various shortcomings of previous techniques are overcome. More particularly, a need has arisen for a computer system and method for preparing a computer-readable medium, in which efficiency is increased relative to previous techniques.

SUMMARY

One embodiment, accordingly, provides a computer system including a computer-readable medium, and means for forming first and second partitions within the computer-readable medium. The second partition is within the first partition.

A principal advantage of this embodiment is that various shortcomings of previous techniques are overcome, and efficiency is increased relative to previous techniques.

DETAILED DESCRIPTION

Figure 1:
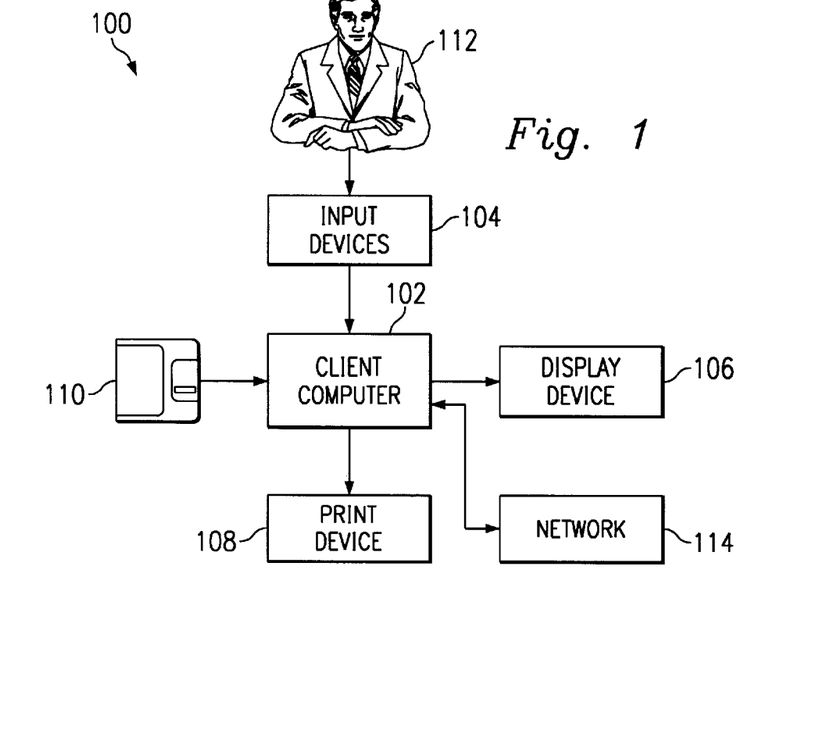
FIG. 1 is a block diagram of a computer system according to the illustrative embodiment.

FIG. 1 is a block diagram of a computer system, indicated generally at 100, according to the illustrative embodiment. System 100 includes input devices 104, a display device 106, a print device 108, and a computer 102 for executing processes and performing operations (e.g. communicating information) in response thereto as discussed further hereinbelow. In the illustrative embodiment, computer 102 is an IBM-compatible personal computer ("PC") that executes Microsoft Windows 95 operating system software. All Microsoft products identified herein are available from Microsoft Corporation, One Microsoft Way, Redmond, Wash. 98052-6399, telephone: (425) 882-8080.

Computer 102 is connected to input devices 104, display device 106 and print device 108. Display device 106 is, for example, a conventional electronic cathode ray tube. Print device 108 is, for example, a conventional electronic printer or plotter. Also, computer 102 includes internal speakers for outputting audio signals. In an alternative embodiment, the speakers are external to computer 102. Moreover, system 100 includes a computer-readable medium (or apparatus) 110, such as a floppy computer diskette and/or a computer hard disk.

A human user 112 and computer 102 operate in association with one another. For example, in response to signals from computer 102, display device 106 displays visual images, and user 112 views such visual images. Also, in response to signals from computer 102, print device 108 prints visual images on paper, and user 112 views such visual images. Further, user 112 operates input devices 104 in order to output information to computer 102, and computer 102 receives such information from input devices 104.

Input devices 104 include, for example, a conventional electronic keyboard and a pointing device such as a conventional electronic "mouse", rollerball or light pen. User 112 operates the keyboard to output alphanumeric text information to computer 102, and computer 102 receives such alphanumeric text information from the keyboard. User 112 operates the pointing device to output cursor-control information to computer 102, and computer 102 receives such cursor-control information from the pointing device.

Computer-readable medium 110 and computer 102 are structurally and functionally interrelated with one another as described further hereinbelow. Computer-readable medium 110 stores (e.g. encodes, records, or embodies) functional descriptive material (e.g. including but not limited to computer programs (also referred to as software or applications) and information structures). Such functional descriptive material imparts functionality when encoded on computer-readable medium 110. Also, such functional descriptive material is structurally and functionally interrelated to computer-readable medium 110.

Within such functional descriptive material, information structures define structural and functional interrelationships between such information structures and computer-readable medium 110 (and other aspects of system 100). Such interrelationships permit the information structures' functionality to be realized. Also, within such functional descriptive material, computer programs define structural and functional interrelationships between such computer programs and computer-readable medium 110 (and other aspects of system 100). Such interrelationships permit the computer programs' functionality to be realized.

For example, computer 102 reads (e.g. loads, accesses, or copies) such functional descriptive material into a computer memory device (e.g. random access memory ("RAM")) of computer 102, and computer 102 performs its operations (as described elsewhere herein) in response to such material which is stored in such memory device. More particularly, computer 102 performs the operation of processing (e.g. executing) a computer application (that is stored, encoded, recorded or embodied on a computer-readable medium) for causing computer 102 to perform additional operations (as described elsewhere herein). Accordingly, such functional descriptive material exhibits a functional interrelationship with the way in which computer 102 executes its processes and performs its operations.

Further, computer-readable medium 110 is an apparatus from which the computer application is accessible by computer 102, and the computer application is processable by computer 102 for causing computer 102 to perform such additional operations. In addition to reading such functional descriptive material from computer-readable medium 110, computer 102 is capable of reading such functional descriptive material from (or through) a computer network 114 which is another type of computer-readable medium (or apparatus). Moreover, the computer memory device is itself a computer-readable medium (or apparatus).

Figure 2:
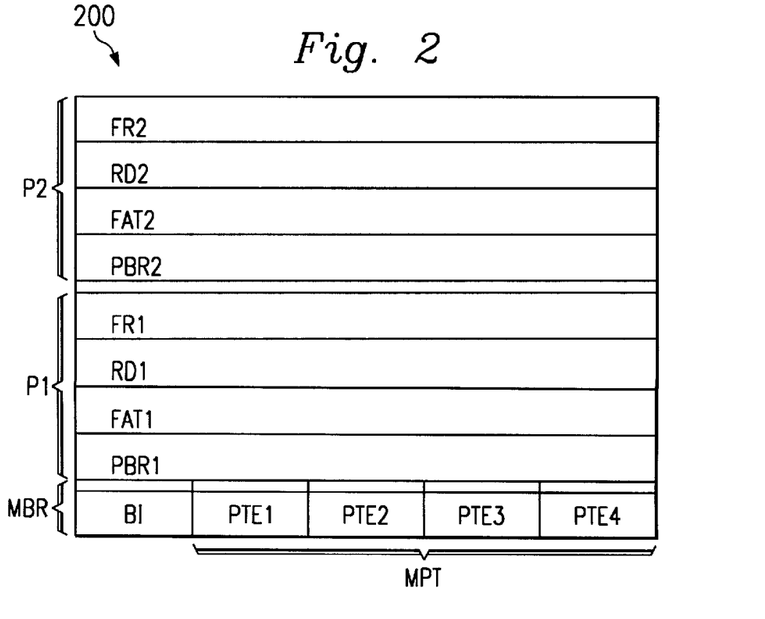
FIG. 2 is a conceptual illustration of an embodiment of information stored by a hard disk of the computer system of FIG. 1.

FIG. 2 is a conceptual illustration of information, indicated generally at 200, stored by a hard disk of computer-readable medium 110. A drive controller of computer 102 outputs signals to the hard disk of computer-readable medium 110, and the hard disk stores such information in response to such signals. Such information includes a master boot record MBR, as shown in FIG. 2.

In accordance with the IBM-compatible personal computer ("PC") architecture, the MBR is the first sector (cylinder 0, head 0, sector 1) on the hard disk of computer-readable medium 110. A sector is the smallest individually addressable unit of storage on a hard disk. Under the IBM-compatible personal computer ("PC") architecture, hard disks have a sector size of 512 bytes. Accordingly, in the illustrative embodiment, to the extent that computer 102 forms (e.g. creates or modifies) a partition on the hard disk, computer 102 defines the partition along cylinder boundaries. A cylinder is a unit of organization on a hard disk that is equal to the number of read/write heads multiplied by the number of sectors per track multiplied by the number of bytes per sector.

The MBR includes bootstrap instructions BI and a master partition table MPT for managing disk storage. In accordance with the IBM-compatible personal computer ("PC") architecture, the MPT includes four partition table entries, namely PTE1, PTE2, PTE3 and PTE4. A partition table entry PTEx (where x=1, 2, 3 or 4) includes information that describes the size, location, and type (extended, new technology file system ("NTFS"), 16-bit or 32-bit file allocation table ("FAT"), primary or utility) of a partition Px associated with such PTEx.

Each partition table entry PTEx includes a respective "active" flag. The drive controller of computer 102 outputs signals to the hard disk of computer-readable medium 110, so that a maximum of only one of the four partition table entries PTEx is marked as "active" at any particular moment (i.e. only a maximum of one of the four "active" flags is set to a logic 1 true state at any particular moment). BI includes instructions for determining whether (and which) one of the partition table entries PTEx is marked as "active."

In the example of FIG. 2, the hard disk of computer-readable medium 110 includes partitions P1 and P2. Partition P1 includes a partition boot record PBR1, a file allocation table FAT1, a root directory RD1, and a file region FR1. Partition P2 includes a partition boot record PBR2, a file allocation table FAT2, a root directory RD2, and a file region FR2.

With the operating system software, computer 102 designates (e.g. maps, or refers to) a partition by an associated logical drive letter (e.g. C: or A:) that identifies a respective logical drive associated with the partition. With such designation, the partition likewise is associated with the respective logical drive. However, without such designation, it is possible for a partition to be unassociated with any logical drive.

A computer, such as computer 102, is "booted" (or "rebooted") when it initiates execution of operating system software (e.g. Microsoft Windows) in response to an event ("boot M event"). Such a boot event may be, for example, user 112 "turning on" computer 102 (e.g. user 112 causing application of electrical power to computer 102 by switching an on/off button of computer 102). Alternatively, such a boot event may be receipt by computer 102 of a command to initially execute the operating system software. For example, computer 102 may receive such a command from user 112 (e.g. through input devices 104), or from a computer application executed by computer 102, or from another computer (e.g. through network 114).

Notably, in response to booting (or rebooting) computer 102:

(a) computer 102 reads instructions into a memory device of computer 102: (i) from BI; and (ii) from PBRx if partition table entry PTEx is marked as "active;" and (b) executes such instructions in response to a read-only memory ("ROM") basic input/output system ("BIOS") of computer 102.

PBRx is the partition boot record of Px, which is the partition associated with PTEx. In the illustrative embodiment, a PBRx is a single sector of information. BI and each PBRx include instructions according to the operating system software's type, version, and language.

In response to signals from computer 102, an FRx stores information files. Each FRx is divided into a number C of information clusters. A particular cluster is designated as cluster b, where b is an integer number between 0 and C−1.

In the illustrative embodiment, the clusters within a particular FRx are equally sized, so that each cluster has a size=$2^y$, where y is an integer number and $C*2^y$ is less than or equal to the size of the particular FRx. Accordingly, PBRx includes a BIOS parameter block that specifies y and C for the particular FRx. Each FRx has its own respective size, and each partition has its own respective values of y and C.

In the illustrative embodiment, each root directory RDx includes space for storing up to 512 entries per RDx. Such an entry is associated with an information file and includes the file's filename (e.g. PROGRAM.EXE, DATA.DAT, COMMANDS.BAT), date, time, size, attributes (e.g. hidden), and starting cluster. The starting cluster is one of the C clusters within FRx.

Figure 3:
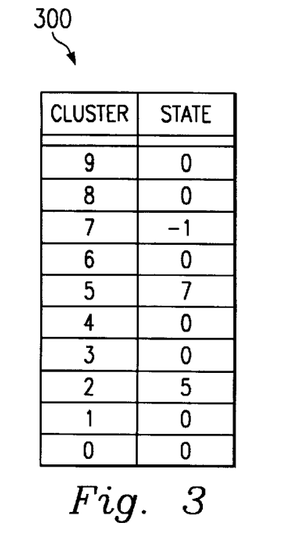
FIG. 3 is a conceptual illustration of an embodiment of information stored within a file allocation table of FIG. 2.

FIG. 3 is a conceptual illustration of information, indicated generally at 300, stored by the hard disk within a file allocation table FATx. More particularly, in the example of FIG. 3, information 300 is stored within FAT1. Each file allocation table FATx includes C entries, each associated with a respective one of the clusters within FRx. In the example of FIG. 3, C=10, so that FATx includes ten entries numbered b=0 through 9. Each entry includes a respective state.

In the illustrative embodiment, if the state of entry b is FFF0, FFF1, FFF2, FFF3, FFF4, FFF5 or FFF6, then entry b is Reserved. By comparison, if the state of entry b is 0, then entry b is Available. If the state of entry b is a number besides 0, FFF0, FFF1, FFF2, FFF3, FFF4, FFF5 or FFF6, then entry b is Allocated. If entry b is Allocated and has a state of −1, then entry b is a Final Entry and does not identify a next entry. If entry b is Allocated and has a state besides −1, then the state of entry b identifies a next entry q, where q is an integer number between 0 and C−1.

For accessing (e.g. writing information into or reading information from) a partition Px, a processor of computer 102 outputs a command to the drive controller of computer 102, and the drive controller receives such command. Such command is addressed to partition Px (and, accordingly, to a respective logical drive associated with partition Px) by specifying an associated logical drive letter (e.g. C: or A:) that designates partition Px (and, accordingly, that identifies a respective logical drive associated with partition Px). Such command also specifies a particular information file by its filename.

In response to such command: (a) the drive controller reads RDx of the addressed partition Px from the hard disk, (b) if an entry within RDx includes the filename, the drive controller identifies the file's starting cluster f, as identified by such entry within RDx, where f is an integer number between 0 and C−1; and (c) if an entry within RDx does not include the filename, the drive controller (i) allocates a starting cluster f for the file, so that the allocated starting cluster f is associated with an Available entry f within FATx, and (ii) writes, in an available entry within RDx, the file's filename, the then-current date, the then-current time, the file's size, the file's attributes, and an identification of the file's starting cluster f.

In either of the foregoing situations (a) or (b), the drive controller: allocates or de-allocates one or more other clusters if (and to the extent) appropriate for storing the entire file; and suitably modifies entries within FATx to accurately indicate an order for accessing such clusters in connection with reading and writing the file. Such entries within FATx accurately indicate such order as discussed further hereinbelow in connection with the "next entry" and Final Entry discussion. Before allocating a cluster, the drive controller verifies that the allocated cluster is associated with an Available entry within FATx. After de-allocating a cluster, the drive controller changes the cluster's associated entry within FATx to be Available.

After identifying the file's starting cluster f, the drive controller performs the operations described in the following paragraph for the situation where b=f.

The drive controller reads entry b within FATx that is associated with cluster b of FRx. If entry b is Reserved, the drive controller outputs a signal to the processor of computer 102 for indicating denial of access to cluster b (and likewise to the particular information file specified by the filename). By comparison, if entry b is Allocated, the drive controller accesses cluster b in a manner specified by the command from the processor of computer 102 (e.g. in response to a "read" command, the drive controller reads information stored in cluster b and outputs such information to the processor of computer 102, and the processor of computer 102 receives such information; in response to a "write" command, the drive controller receives information from the processor of computer 102 and writes such information into cluster b). After accessing cluster b: (a) if entry b is a Final Entry, then access to the particular information file is complete and the drive controller awaits a next command from the processor of computer 102; and (b) if entry b is not a Final Entry, the drive controller repeats the operations described in this paragraph for the situation where b=q (as mentioned above, next entry q is identified by the state of entry b). Accordingly, in the example of FIG. 3, if the file's starting cluster f=2, the drive controller accesses the sequence of clusters 2, 5 and 7 of FRx.

In the illustrative embodiment, the state of entry b within FATx is a 16-bit entry that identifies next entry q within FRx, and the largest logical drive (and likewise the largest partition) managed by computer 102 is (a) two gigabytes for the Microsoft DOS operating system software, (b) two gigabytes for the Microsoft Windows 95 operating system software, and (c) four gigabytes for the Microsoft Windows NT operating system software. In an alternative embodiment, the state of entry b within FATx is a 32-bit entry that identifies next entry q within FRx, and the largest logical drive (and likewise the largest partition) managed by computer 102 is two terabytes for version 5.0 of the Microsoft Windows NT operating system software and for the Microsoft Windows 95 OSR2 operating system software. In the illustrative embodiment, a terabyte is $1024^4$ bytes, a gigabyte is $1024^3$ bytes, and a megabyte is $1024^2$ bytes.

Figure 4:
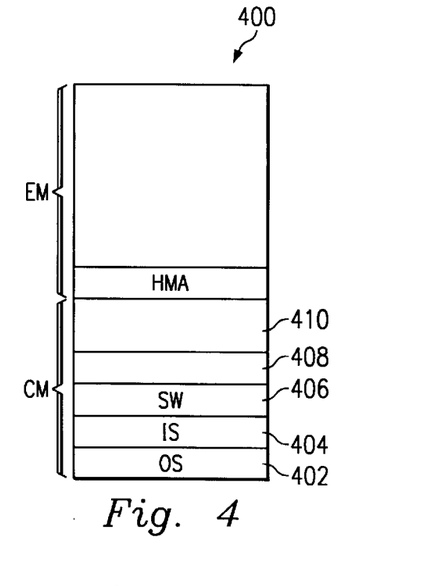
FIG. 4 is a conceptual illustration of an embodiment of a memory device of the computer system of FIG. 1.
Figure 5A:
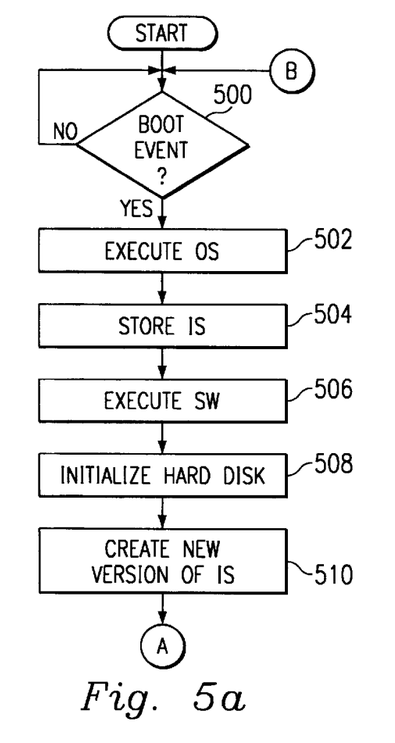
FIGS. 5a–b ("FIG. 5") are a flowchart of operation of the computer system of FIG. 1.
Figure 5B:
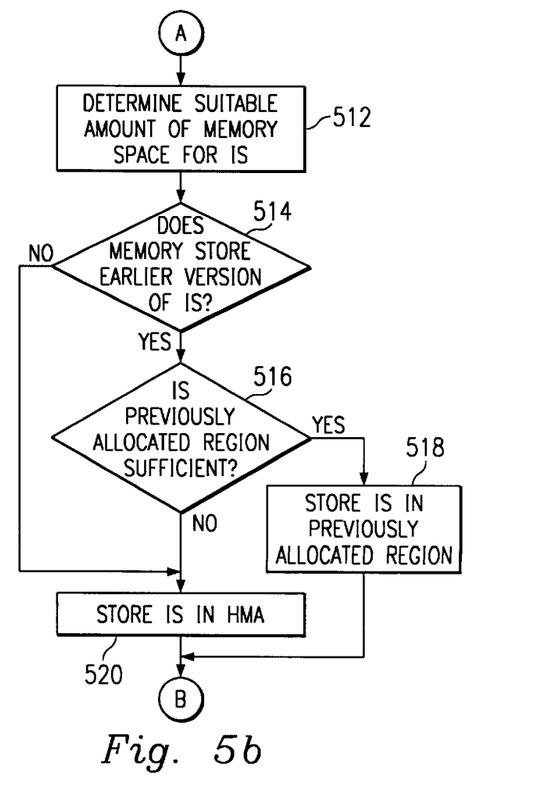

FIG. 4 is a conceptual illustration of a memory device, indicated generally at 400, of computer 102. FIG. 5 is a flowchart of operation of system 100. The following discussion refers simultaneously to FIGS. 4 and 5.

As shown in FIG. 4, memory device 400 includes a conventional memory region CM and an extended memory region EM. Extended memory region EM includes a high memory area HMA, which is the lowest addressable (i.e. addressed by lowest numbered addresses) 64 kilobytes of space within extended memory region EM. Conventional memory region CM is the lowest addressable 640 kilobytes of space within memory device 400 and includes regions 402, 404, 406, 408 and 410 as shown in FIG. 4.

At a step 500, computer 102 determines whether to initiate execution of the OS in response to a boot event. In response to booting (or rebooting) computer 102, computer 102 copies portions of the Microsoft DOS operating system software ("OS") from computer-readable medium 110 into region 402, and computer 102 reads and executes such portions at a step 502. Region 402 is the lowest addressable region within CM. Computer 102 stores the OS in region 402, because the OS is among the first software that computer 102 executes in response to booting (or rebooting).

In executing the OS, computer 102 allocates region 404 for storing information structures IS at a step 504. Information structures IS include information for identifying logical drives. For example, information structures IS include information that identifies a respective logical drive associated with a partition (of the hard disk of computer-readable medium 110). More particularly, in the illustrative embodiment, information structures IS include information that designates the partition by an associated logical drive letter (e.g. C: or A:) that identifies a respective logical drive.

Also, in executing the OS, computer 102 copies portions of application software ("SW") from computer-readable medium 110 into region 406, and computer 102 reads and executes such portions at a step 506.

Notably, a new hard disk is normally blank and does not contain partitioning information. In a first situation, if a new hard disk is blank and is installed in system 100, and computer 102 is booted (or rebooted), then computer 102 (in executing the OS) recognizes the lack of partitions on the disk. In this first situation, computer 102 (in executing the OS) does not store information structures IS in region 404 for identifying logical drives. In a second situation, computer 102 (in executing the OS) recognizes partitions on the disk and stores information structures IS in region 404 for identifying logical drives, yet computer 102 (in executing the application software SW) recognizes a need for adding, modifying or deleting partitions on the disk.

In executing the application software SW in either the first situation or the second situation, computer 102 initializes (e.g. prepares) the disk by formatting it and suitably adding, modifying or deleting one or more partitions on it at a step 508. In the illustrative embodiment, such initialization is part of a process executed by computer 102 to install programs and information structures on the disk for supporting various devices of system 100. After computer 102 adds, modifies or deletes one or more partitions on the disk, information structures IS (which identify logical drives) are subject to inaccuracies unless and until computer 102 forms (e.g. stores in memory device 400) information structures IS in response to the added, modified and/or deleted partitions at a step 510.

According to previous techniques, after so initializing the disk, computer 102 would be rebooted before computer 102 (in executing the OS) would form (e.g. store in memory device 400) information structures IS in response to the added, modified and/or deleted partitions. Such rebooting of computer 102 consumes up to several minutes of time. As part of a high volume computer assembly or manufacturing operation, blank hard disks are installed in a large number of computers. In such an operation, the addition of several minutes of rebooting time per computer is inefficient.

As mentioned hereinabove, information structures IS include information that identifies a respective logical drive associated with a partition (of the hard disk of computer-readable medium 110). In a significant aspect of the illustrative embodiment, irrespective of whether computer 102 is rebooted (e.g. even before or without rebooting): computer 102 advantageously forms (e.g. stores in memory device 400) information structures IS in response to added, modified and/or deleted partitions; and computer 102 accesses such a partition in response to a command addressed to the respective logical drive associated with the partition. Notably, if computer 102 adds (or, in some situations, modifies) partitions on the disk, then region 404 normally is insufficiently large for storing all of information structures IS.

As an example, in designating a partition by the letter C: associated with a respective logical C: drive, computer 102: (a) creates the information structures IS in the form of a drive descriptor table ("DDT") and a drive parameter block ("DPB"); (b) modifies a current directory structure ("CDS") associated with the logical C: drive, which is implemented as a linear array rather than a linked list, such that computer 102 does not allocate additional memory space for the CDS; and (c) modifies a system variables ("SysVars") table of computer 102 to include an indication of the logical C: drive.

According to previous techniques, after computer 102 forms information structures IS in response to added, modified and/or deleted partitions, computer 102 would store the information structures IS in region 408, to the extent that region 404 is insufficiently large. Nevertheless, after computer 102 finishes executing application software SW, region 406 becomes reallocatable by computer 102 for storing different information (e.g. additional information structures, or portions of different application software). A shortcoming of previous techniques is that region 408 is interposed (within the range of addresses that address space within conventional memory region CM) between reallocatable region 406 and region 410, thereby fragmenting a set of information (e.g. portions of a single software program) stored in regions 406 and 410.

Such fragmentation would add complexity to the operations of computer 102, because computer 102 would perform additional operations for detecting whether, when and how to skip region 408 when addressing the set of information stored in regions 406 and 410. Complexity of computer 102 would be increased by storing the set of information in regions 406 and 408 instead of regions 406 and 410. This is because regions 406 and 408 (unlike regions 406 and 410) are addressable by a continuous uninterrupted range of addresses.

In a significant aspect of the illustrative embodiment, after computer 102 forms information structures IS in response to added, modified and/or deleted partitions at step 510, computer 102 determines: (a) at a step 512, a suitable amount of memory space for storing the information structures IS; (b) at a step 514, whether region 404 already stores an earlier version of information structures IS; and (c) at a step 516, whether region 404 is sufficiently large to store all of the new version of information structures IS. If region 404 is sufficiently large to store all of the new version of information structures IS, then computer 102 stores all of information structures IS in region 404 at a step 518.

Size of the information structures IS is a function of the OS version and a partition's type. For determining whether region 404 already stores an earlier version of information structures IS, computer 102 reads a "number of physical drives" field (which equates to a number of DPBs) from a system variables table ("SysVars") of the OS. If the "number of physical drives" field is two, then region 404 does not already store an earlier version of information structures IS.

Significantly, after determining a suitable amount of memory space for storing the information structures IS at step 512, computer 102 stores the information structures IS in high memory area HMA (at a step 520) instead of region 408 (and without intruding on conventional memory region CM), to the extent that region 404 is insufficiently large. In that manner, region 408 remains allocatable by computer 102 for storing a set of information in combination with region 406 and/or region 410, thereby diminishing fragmentation and achieving a larger continuous block of conventional memory region CM for storing the set of information. Accordingly, in comparison to previous techniques, computer 102 of the illustrative embodiment is less complex.

Moreover, by storing the information structures IS in high memory area HMA, computer 102 advantageously addresses the information structures IS with 16-bit addresses, and computer 102 advantageously accesses the information structures IS without invoking special protocols (e.g. 32-bit addressing, and protected modes). In that manner, the information structures IS are more readily accessible in a manner compatible with the Microsoft DOS operating system software, which is a 16-bit operating system. Conversely, computer 102 accesses other regions (besides HMA) within extended memory region EM by invoking special protocols that add complexity to the operations of computer 102.

For storing the information structures IS in HMA, computer 102 attempts to allocate a sufficient portion of the HMA by executing Int 2Fh functions 4Ah of the OS. Such an attempt is effective if computer 102 executes an extended memory specification ("XMS") driver software program (e.g. as implemented by the HIMEM.SYS driver software program supplied with the OS) and copies the OS into the HMA (by executing a "DOS=HIGH" command). If effective, computer 102 executes the XMS driver software program to identify and reallocate a sufficient portion of the HMA for storing the information structures IS.

If not effective, computer 102 attempts to allocate the entire HMA for storing the information structures IS by enabling the A20 address line. Computer 102 enables the A20 address line by performing suitable BIOS operations, including executing Int 15h function 24h of X the OS. However, if the BIOS does not support such operations, computer 102 enables the A20 address line by outputting suitable commands directly to a keyboard controller of computer 102.

Alternatively, computer 102 stores the information structures IS within the highest addressable space of conventional memory region CM instead of the HMA, to the extent that region 404 is insufficiently large. Computer 102 does so if computer 102 unsuccessfully attempts to allocate the HMA for storing the information structures IS. Also, computer 102 does so if computer 102 has a need to test the HMA without erasing the information structures IS.

In storing the information structures IS, computer 102 links the information structures IS with an earlier version, if any, of the information structures IS already stored in memory device 400 (e.g. an earlier version stored in region 404), to the extent that such earlier version remains valid. Computer 102 performs such linking, irrespective of whether computer 102 stores the information structures IS in the HMA or in the highest addressable space within conventional memory region CM. Advantageously, computer 102 performs such creation, storage and linking of information structures IS in approximately one second or less, as compared to several minutes that might otherwise be consumed in rebooting computer 102. After either step 518 or step 520, the operation of system 100 in FIG. 5 returns to step 500.

Figure 6:
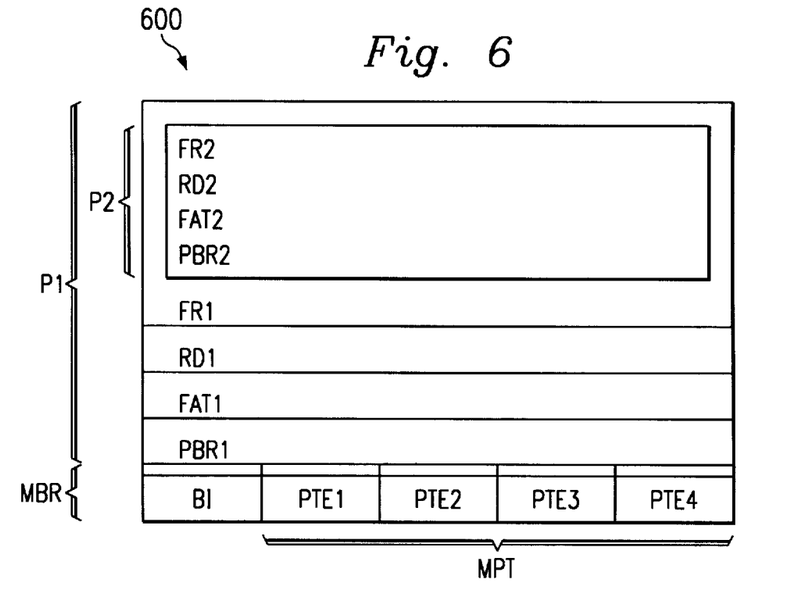
FIG. 6 is a conceptual illustration of an alternative embodiment of information stored by a hard disk of the computer system of FIG. 1.

FIG. 6 is a conceptual illustration of information, indicated generally at 600, stored by the hard disk of computer-readable medium 110. Information 600 is an alternative version of information 200 of FIG. 2.

In the example of FIG. 6, as in the example of FIG. 2, the hard disk of computer-readable medium 110 includes partitions P1 and P2. As in FIG. 2, partition P1 includes a partition boot record PBR1, a file allocation table FAT1, a root directory RD1, and a file region FR1. Similarly, partition P2 includes a partition boot record PBR2, a file allocation table FAT2, a root directory RD2, and a file region FR2.

In a significant aspect of the illustrative embodiment, in the example of FIG. 6, partition P1 is a "primary" partition, and partition P2 is a "utility" partition that is located within FR1. More particularly, partition P2 is located within clusters 8 and 9 of FR1. In the illustrative embodiment, if system 100 forms a utility partition within a primary partition, system 100 forms the utility partition within the highest addressable clusters of the primary partition. In that manner, system 100 avoids significantly increasing time for accessing clusters in response to commands that are addressed to the primary partition. System 100 makes a sufficient integer number of such clusters Reserved for the utility partition, rounded up to the nearest cylinder boundary in order to maintain compatibility with OS utility programs such as FDISK.

In this example, partition P2 of information 600 is identical to partition P2 of information 200, in terms of structure, size, location and operation. However, FR1 of information 600 is larger than FR1 of information 200. In that manner, FR1 of information 600 is sufficiently large to accommodate partition P2 within clusters 8 and 9 of FR1.

A utility partition may, for example, store programs and information that are useful during manufacture, assembly and test of system 100. Nevertheless, in at least one situation, such programs and information are less useful, and perhaps not even needed, during subsequent use and operation of system 100. In such a situation, after manufacture, assembly and test of system 100: (a) the utility partition itself is less useful, and perhaps not even needed; (b) as compared to the utility partition, a primary partition is more useful during subsequent use and operation of system 100; and (c) advantageously, system 100 of the illustrative embodiment is able to delete the utility partition so that sectors are reallocated from the utility partition to the primary partition. In that manner, the primary partition of the hard disk is advantageously enlarged to achieve a more versatile subsequent use and operation of system 100.

Figure 7:
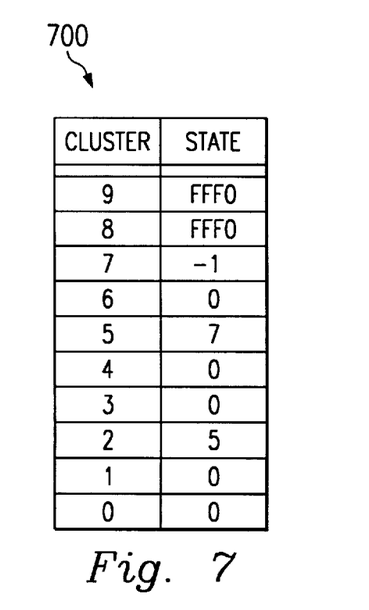
FIG. 7 is a conceptual illustration of information stored within a file allocation table of FIG. 6.

FIG. 7 is a conceptual illustration of information, indicated generally at 700, stored by the hard disk within a file allocation table FAT1 of information 600. As shown in FIG. 7, entries 8 and 9 are Reserved, in contrast with information 300 of FIG. 3 in which such entries are Available. Except for entries 8 and 9, information 700 is identical to information 300 of FIG. 3.

In this example, with the OS, computer 102 designates primary partition P1 by letter C: and designates utility partition P2 by letter A:. In that manner, computer 102 maps primary partition P1 to a logical C: drive and maps utility partition P2 to a virtual A: drive. Such an A: drive is "virtual," because its actual storage space is located on the hard disk of computer-readable medium 110 instead of the floppy computer diskette of computer-readable medium 110. During manufacture, assembly and test of system 100, computer 102 marks (in the MPT) utility partition P2 as being active, so that computer 102 executes instructions from PBR2 in response to a boot event.

As mentioned hereinabove in connection with FIG. 3, for accessing a partition P1, the processor of computer 102 outputs a command to the drive controller of computer 102, and the drive controller receives such command. For example, such command is addressed to partition P1 by specifying letter C: that designates partition P1. Before allocating a cluster for storing a file in response to such command addressed to partition P1, the drive controller verifies that the allocated cluster is associated with an Available entry within FAT1. Accordingly, so long as entries 8 and 9 are Reserved instead of Available within FAT1, the drive controller does not so allocate either of clusters 8 or 9.

In that manner, by making entries 8 and 9 Reserved within FAT1 of information 600, system 100 is able to reliably locate partition P2 within clusters 8 and 9 of FR1. This is because clusters 8 and 9 are inaccessible by the processor of computer 102 outputting (to the drive controller) a command that is addressed to partition P1 (e.g. by specifying letter C: that designates partition P1). Instead, clusters 8 and 9 are accessible by the processor of computer 102 outputting (to the drive controller) a command that is addressed to partition P2 (e.g. by specifying letter A: that designates partition P2).

Likewise, system 100 is able to reliably locate one or more additional partitions (e.g. a partition P3) within FR2 (which itself is located within FR1) by suitably making one or more entries Reserved within FAT2 of information 600. In such an example, clusters associated with such Reserved entries are inaccessible by the processor of computer 102 outputting (to the drive controller) a command that is addressed to partition P1 or partition P2. Instead, such clusters are accessible by the processor of computer 102 outputting (to the drive controller) a command that is addressed to the additional partition (e.g. a partition P3), as for example by such command specifying an associated logical drive letter that designates the additional partition.

In the example of FIG. 6, computer 102 initializes the master partition table MPT (of the MBR) to a specific state for both primary partition P1 and utility partition P2. In the illustrative embodiment, utility partition P2 is relatively small (e.g. approximately ten megabytes). Initially, PTE1 is associated with primary partition P1, and PTE2 is associated with utility partition P2.

Figure 8:
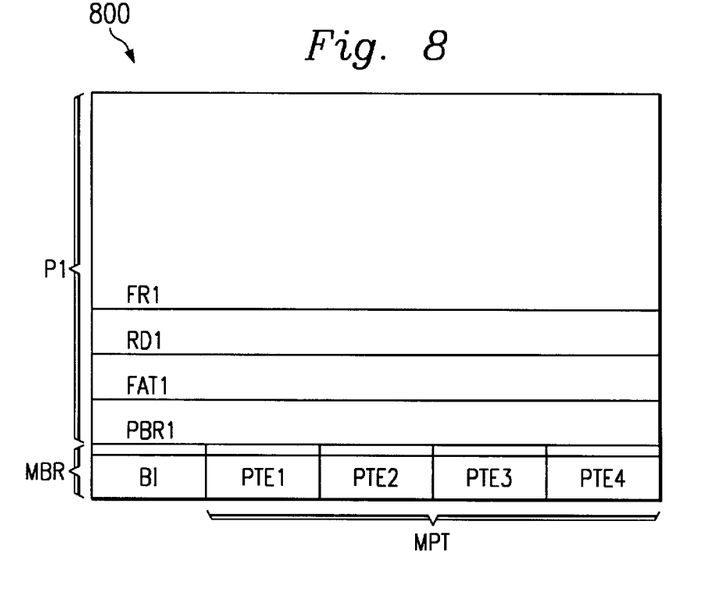
FIG. 8 is a conceptual illustration of another alternative embodiment of information stored by a hard disk of the computer system of FIG. 1.
Figure 9:
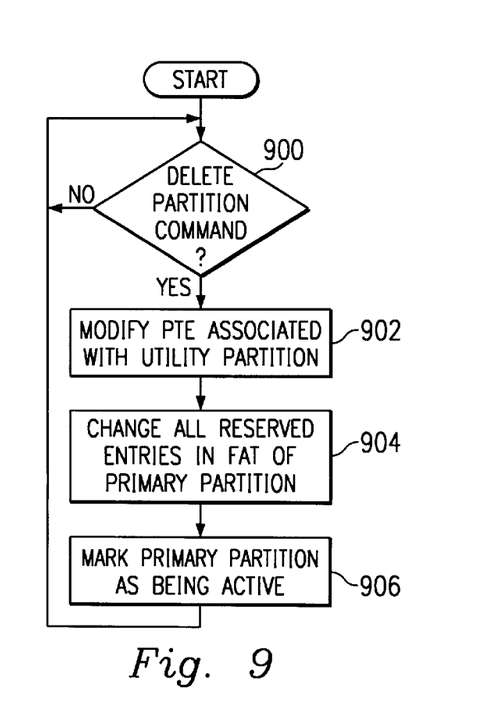
FIG. 9 is another flowchart of operation of the computer system of FIG. 1.

FIG. 8 is a conceptual illustration of information, indicated generally at 800, stored by the hard disk of computer-readable medium 110. Information 800 is an alternative version of information 600 of FIG. 6. FIG. 9 is a flowchart of operation of system 100. The following discussion refers simultaneously to FIGS. 8 and 9.

At a step 900, system 100 determines whether a "delete partition" command is issued. In response to a suitable "delete partition" command (e.g. a command received by system 100 after manufacture, assembly and test of system 100), system 100 deletes utility partition P2 by: (a) at a step 902, suitably modifying the partition table entry PTEx (e.g. PTE2 in this example) associated with utility partition P2, so that partition P2 is no longer recognized by computer 102; (b) at a step 904, changing all Reserved entries in information 700 (stored by the hard disk within FAT1 of information 600) of FIG. 7 to be Available (e.g. changing information 700 to be completely identical to information 300 of FIG. 3); and (c) at a step 906, marking (in the MPT) primary partition P1 as being active, so that computer 102 executes instructions from PBR1 in response to a boot event. After step 906, the operation of system 100 in FIG. 9 returns to step 900.

Such deletion of utility partition P2 is illustrated in FIG. 8. This technique is advantageous relative to previous techniques in which system 100 recreates or extensively modifies a primary partition in order to reallocate sectors from a utility partition to the primary partition. In contrast, system 100 achieves such reallocation by merely deleting utility partition P2 as discussed in the immediately preceding paragraph, which is substantially faster than such previous techniques.

For example, in the illustrative embodiment, if system 100 automatically performs such deletion of utility partition P2, such activity is performed in a number of seconds or less. In contrast, if a human user manually (with some assistance from a previous computer program) performs recreation or extensive modification of a primary partition, such activity may be performed in a number of hours. In manually performing such activity, the human user may be compelled to evaluate and specify the primary partition's size, location, type, and values of y and C, plus size of the partition's file region FRx; moreover, the human user may be compelled to relocate potentially large amounts of information between regions of the hard disk of computer-readable medium 110.

One example of such a "delete partition" command is a "break the seal" command from user 112. For example, if user 112 operates input devices 104 in a manner that indicates acceptance by user 112 of system 100 (and/or of a license agreement governing use of system 100), then system 100 responds to such acceptance as a "break the seal" command. Such a "break the seal" command is one technique for indicating (a) completion of manufacture, assembly and test of system 100 and (b) initiation of subsequent use and operation of system 100.

Alternatively, if preferred for a particular situation, after manufacture, assembly and test of system 100, system 100 is able to retain a utility partition (e.g. partition P2 in FIG. 6) for 23 storing programs and information that are useful to diagnose a subsequent malfunction of system 100. For example, if system 100 includes a NET PC (e.g. a PC that has no floppy computer diskette and relies upon a connection to network 114 in order to receive and output information to and from another system), such retention is helpful for diagnosing a malfunction of the NET PC. This is especially true if the malfunction negatively affects the NET PC's ability to otherwise receive such diagnostics through network 114 (FIG. 1) from another system.

In response to a suitable type of "delete partition" command, system 100 achieves such retention of utility partition P2 by: (a) suitably modifying the partition table entry PTEx (e.g. PTE2 in this example) associated with utility partition P2; (b) retaining all Reserved entries in information 700 (stored by the hard disk within FAT1 of information 600) of FIG. 7, so that such entries continue not being Available; and (c) marking (in the MPT) primary partition P1 as being active, so that computer 102 executes instructions from PBR1 in response to a boot event. In response to a suitable "restore partition" command for subsequently accessing programs and information stored in utility partition P2, system 100: (a) suitably modifies the partition table entry PTEx (e.g. PTE2 in this example) associated with utility partition P2, so that partition P2 is recognized by computer 102; and (b) if preferred, marking (in the MPT) utility partition P2 as being active, so that computer 102 executes instructions from PBR2 in response to a boot event.

If necessary for such execution of the "delete partition" command, system 100 is able to: (a) identify the Reserved entries in information 700 (stored by the hard disk within FAT1 of information 600) of FIG. 7 by suitably reading and evaluating FAT1; and (b) after identifying Reserved entries, read and evaluate the clusters associated with such Reserved entries in order to determine suitable information for storage in the partition table entry PTEx (e.g. PTE2 in this example) associated with utility partition P2.

A Notably, in response to a suitable "swap" command, computer 102 is able to execute a program that swaps the logical C: drive designation between primary partition P1 and utility partition P2. For example, if (immediately before receiving such a command) computer 102 designates primary partition P1 by letter C: and designates utility partition P2 by letter A:, then (in response to such a command) computer 102 modifies its mapping of partitions P1 and P2, so that computer 102 instead maps primary partition P1 to the virtual A: drive and maps utility partition P2 to the logical C: drive. Computer 102 accomplishes such a swap by modifying information within a DPB and DDT (e.g. for the logical C: drive) to incorporate parameters for either primary partition P1 or utility partition P2, as applicable.

As mentioned hereinabove in connection with FIG. 2, in response to booting (or rebooting) computer 102:

(a) computer 102 reads instructions into a memory device of computer 102: (i) from BI; and (ii) from the partition table entry PTEx (e.g. PTE2 in this example) associated with utility partition P2 if such partition table entry PTEx is marked as "active;" and (b) executes such instructions in response to a read-only memory ("ROM") basic input/output system ("BIOS") of computer 102.

In one example embodiment, with regard to the instructions from the partition table entry PTEx (e.g. PTE2 in this example) associated with utility partition P2, such instructions include instructions for modifying such PTEx. More particularly, such instructions change the type of partition P2 from a utility type to either a 16-bit or 32-bit FAT type. In that manner, PTEx is self-modifying. Such a technique for self-modification is advantageous if: (a) the utility type of partition is not recognized by the OS and/or computer 102; and (b) in contrast, the 16-bit or 32-bit FAT type of partition is so recognized.

Although illustrative embodiments have been shown and described, a vide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system comprising:
   a processor configured to execute an operating system;
   a computer-readable medium coupled to the processor and including:
      a first partition including a file allocation table and a plurality of regions, the file table including an entry designating one of the plurality of regions as reserved to prevent the one of the plurality of regions from being allocated for use as a part of the first partition;
      a partition table including a first descriptor associated with the first partition; and
   a computer program executable by the processor to cause the processor to:
      add a second descriptor to the partition table to create a second partition that includes the one of the plurality of regions; and
      map a logical drive to the second partition to allow the operating system to access information in the one of the plurality of regions using the logical drive.

2. The computer system of claim 1, wherein the computer program is executable by the processor to cause the processor to:
   store a utility program in the one of the plurality of regions; and
   access the utility program using the logical drive.

3. The computer system of claim 2, wherein the computer program is executable by the processor to cause the processor to:
   map the logical drive as a virtual A: drive; and
   mark the second partition as active to cause the computer system to boot to the second partition in response to a boot event.

4. The computer system of claim 3, wherein the computer program is executable by the processor to cause the processor to:
   in response to a delete partition command:
      mark the second partition as inactive; and
      mark the first partition as active to cause the computer system to boot to the first partition in response to a boot event.

5. The computer system of claim 4, wherein the delete partition command is generated in response to a user operating an input device associated with the computer system.

6. The computer system of claim 4, wherein the computer program is executable by the processor to cause the processor to:
   in response to the delete partition command
      delete the second descriptor; and
      delete the logical drive.

7. The computer system of claim 6, wherein the computer program is executable by the processor to cause the processor to:
   subsequent to deleting the second descriptor and the logical drive:
      add the second descriptor to the partition table to create the second partition that includes the one of the plurality of regions; and
      map the logical drive to the second partition to allow the operating system to access the utility program using the logical drive.

8. The computer system of claim 6, wherein the computer program is executable by the processor to cause the processor to change the entry to designate the one of the plurality of regions as available in response to the delete partition command.

9. The computer system of claim 1, wherein the computer-readable medium includes a hard disk drive.

10. A method performed by a computer system that includes an operating system comprising:
    forming a first partition including a file allocation table and a plurality of regions;
    forming an entry in the file table designating one of the plurality of regions as reserved to prevent the one of the plurality of regions from being allocated for use as a part of the first partition;
    forming a first descriptor associated with the first partition;
    forming a second descriptor to create a second partition that includes the one of the plurality of regions; and
    mapping a logical drive to the second partition to allow the operating system to access information in the one of the plurality of regions using the logical drive.

11. The method of claim 10, further comprising:
    storing a utility program in the one of the plurality of regions; and
    accessing the utility program using the logical drive.

12. The method of claim 11, further comprising:
    mapping the logical drive as a virtual A: drive; and
    marking the second partition as active to cause the computer system to boot to the second partition in response to a boot event.

13. The method of claim 12, further comprising:
    in response to detecting a delete partition command:
       marking the second partition as inactive; and
       marking the first partition as active to cause the computer system to boot to the first partition in response to a boot event.

14. The method of claim 13, further comprising: generating the delete partition command in response to a user operating an input device associated with the computer system.

15. The method of claim 13, further comprising:
in response to detecting the delete partition command:
deleting the second descriptor; and
deleting the logical drive.

16. The method of claim 15, further comprising:
subsequent to deleting the second descriptor and the logical drive:
forming the second descriptor to create the second partition that includes the one of the plurality of regions; and
mapping the logical drive to the second partition to allow the operating system to access the utility program using the logical drive.

17. The method of claim 15, further comprising:
changing the entry to designate the one of the plurality of regions as available in response to the delete partition command.

18. A computer program product comprising:
a computer program processable by a computer system for causing the computer system to:
form a first partition including a file allocation table and a plurality of regions;
form an entry in the file table designating one of the plurality of regions as reserved to prevent the one of the plurality of regions from being allocated for use as a part of the first partition;
form a first descriptor associated with the first partition;
form a second descriptor to create a second partition that includes the one of the plurality of regions; and
map a logical drive to the second partition to allow the operating system to access information in the one of the plurality of regions using the logical drive; and
an apparatus from which the computer program is accessible by the computer system.

19. The computer program product of claim 18, wherein the computer program is processable by the computer system for causing the computer system to:
store a utility program in the one of the plurality of regions; and
access the utility program using the logical drive.

20. The computer program product of claim 19, wherein the computer program is processable by the computer system for causing the computer system to:
map the logical drive as a virtual A: drive; and
mark the second partition as active to cause the computer system to boot to the second partition in response to a boot event.

21. The computer program product of claim 20, wherein the computer program is processable by the computer system for causing the computer system to:
in response to detecting a delete partition command:
mark the second partition as inactive; and
mark the first partition as active to cause the computer system to boot to the first partition in response to a boot event.

22. The computer program product of claim 21, wherein the computer program is processable by the computer system for causing the computer system to:
generate the delete partition command in response to a user operating an input device associated with the computer system.

23. The computer program product of claim 21, wherein the computer program is processable by the computer system for causing the computer system to:
in response to detecting the delete partition command:
delete the second descriptor; and
delete the logical drive.

24. The computer program product of claim 23, wherein the computer program is processable by the computer system for causing the computer system to:
subsequent to deleting the second descriptor and the logical drive:
form the second descriptor to create the second partition that includes the one of the plurality of regions; and
map the logical drive to the second partition to allow the operating system to access the utility program using the logical drive.

25. The computer program product of claim 23, wherein the computer program is processable by the computer system for causing the computer system to:
change the entry to designate the one of the plurality of regions as available in response to the delete partition command.

* * * * *